US007187926B1

(12) United States Patent
Henkel

(10) Patent No.: US 7,187,926 B1
(45) Date of Patent: Mar. 6, 2007

(54) METHOD AND SYSTEM FOR CONTROLLING THE USE OF SATELLITE TRANSMISSION CAPACITY IN TERRESTRIAL NETWORKS

(75) Inventor: Hans-Juergen Henkel, Rossdorf (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/462,017

(22) PCT Filed: Jun. 19, 1998

(86) PCT No.: PCT/EP98/03747

§ 371 (c)(1),
(2), (4) Date: Mar. 30, 2000

(87) PCT Pub. No.: WO99/04507

PCT Pub. Date: Jan. 28, 1999

(30) Foreign Application Priority Data

Jul. 1, 1997 (DE) ................................ 197 28 061

(51) Int. Cl.
*H04Q 7/20* (2006.01)

(52) U.S. Cl. ..................... 455/428; 455/12.1; 455/427

(58) Field of Classification Search .................... 455/8, 455/12.1, 13.1, 13.2; 370/220, 323, 329
See application file for complete search history.

(56) References Cited

U.S. PATENT DOCUMENTS 4,597,079 A * 6/1986 Aoki et al. ................. 370/220

(Continued)

FOREIGN PATENT DOCUMENTS

DE 43 08 161 9/1994

(Continued)

OTHER PUBLICATIONS

CCITT Recommendation E.412, "Network Management Controls," Oct. 1992; Revised Mar. 1998.

*Primary Examiner*—Temica Beamer
*Assistant Examiner*—Joy Contee
(74) *Attorney, Agent, or Firm*—Kenyon & Kenyon LLP

(57) ABSTRACT

A process and system for controlling the use of satellite transmission capacity in terrestrial networks for the substitution of out-of-order data lines. The circuit/process is characterized in that an independent, local control apparatus, which monitors a backup terminal with the software specially written for this application, cooperates in limited manner with the data transmission device of the user and, based on the analysis of a data control signal, detects the need for alternative routing. Via communication lines and modems, the control apparatus switches on the transmission carrier of the affected satellite modem which is connected to a satellite antenna. The satellite antennas are in communication with the satellite via the transmission carrier. All other, non-affected terminals in the network also receive the transmission carrier of the affected satellite modem. The transmission capacity of the asynchronous overhead of the satellite modem is used for the transmission of destination addresses. A hub is provided, which is connected via an interface card or a modem to the terrestrial network that, in turn, is connected via lines to routers. The line is assumed to be out of order. Customer devices or terminals are connected via lines to the routers. The system-specific software-controlled circuit permits independent, decentralized administration of the satellite transmission channels by many satellite terminals without participation of a controlling central station. Thus, even when the terrestrial transmission path is out of order, a free-running alternative routing via a different medium has been achieved.

14 Claims, 3 Drawing Sheets

U.S. PATENT DOCUMENTS

| | | | |
|---|---|---|---|
| 4,722,083 A * | 1/1988 | Tirro et al. | 370/323 |
| 4,731,783 A * | 3/1988 | Fontanes | 370/321 |
| 4,947,451 A * | 8/1990 | Nawata | 455/8 |
| 5,182,744 A * | 1/1993 | Askew et al. | 370/228 |
| 5,430,732 A * | 7/1995 | Lee et al. | 370/319 |
| 5,796,717 A * | 8/1998 | Shinbashi et al. | 370/216 |
| 6,327,243 B1 * | 12/2001 | Gregorat | 370/218 |

FOREIGN PATENT DOCUMENTS

| | | |
|---|---|---|
| DE | 196 10 400 | 9/1997 |
| EP | 0 330 178 | 8/1989 |
| JP | 61 232727 | 10/1986 |
| JP | 01 293020 | 11/1989 |
| JP | 06 284059 | 2/1995 |

* cited by examiner

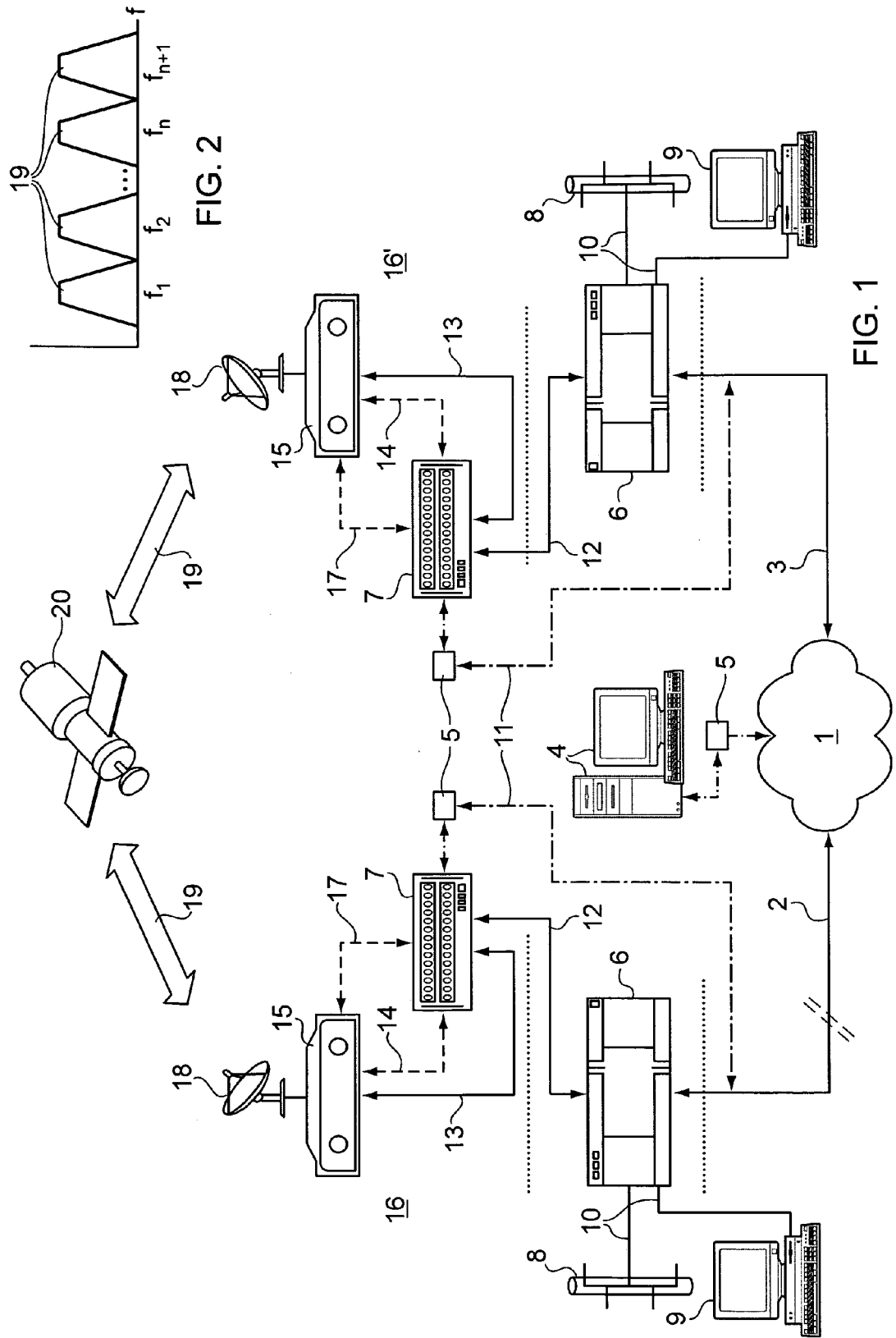

METHOD AND SYSTEM FOR CONTROLLING THE USE OF SATELLITE TRANSMISSION CAPACITY IN TERRESTRIAL NETWORKS

BACKGROUND INFORMATION

The present invention relates to a process and a circuit arrangement for controlling the use of satellite transmission capacity for the substitution of out-of-order data lines in terrestrial networks, respectively.

Switched trunk groups in voice and data networks are generally operated in a two-way alternate manner between computer-controlled switching devices. With this mode of operation, both switching devices are able, independently of each other, to access and occupy unoccupied trunks of the group. If certain data lines go down completely, this also permits automatic alternative routing to an unoccupied and operable data line of a terrestrial network.

The known traffic management processes are summarized and outlined in CCITT Recommendation E.412: "Network Management Controls" (10/92). However, it is also known to remedy out-of-order data lines in terrestrial networks by using spare satellite transmission capacity. Particularly with regard to the access lines, alternative routing via satellite requires a manual initiation after a transmission capacity request has been sent to a central station, a backward channel which is carried via terrestrial lines or via satellite being used for this purpose.

The manual initiation of alternative routing according to the related art is time-intensive. It may even be necessary for connection configurations to be transmitted to the locations involved, and a backward channel must be reliably available in the case of an alternative routing request. This may lead to problems,—particularly in the case of a terrestrial backward channel, for example, if the backward channel and user information channel are carried in one access line—because no backward channel is directly available.

German Published Patent Application No. 43 08 161 describes a system for telecommunication via satellites, which utilizes at least one transmitting station and at least one receiving station, and at least one monitoring circuit for monitoring the signal transmitted from a transmitting station via the satellite link and received by a receiving station. In response to interference of the signal, an alternative link results because provision is made for at least one network module which automatically produces a communications link between a transmitting station and a receiving station via a switched network when one parameter of the signal assumes critical values caused, for example, by weather, and which releases this link again when the parameter of the signal assumes uncritical values. Thus, this system is clearly limited to the monitoring of transmission quality in satellite systems, with the possibility of switching automatically to fixed networks when quality deficiencies have been ascertained in the signal.

In addition, in Japanese Laid-Open Patent Application No. 01 293020, a method is described for replacing defective satellite transmission channels by lines of fixed networks. Just as the method described above, this method is not usable for the case when lines of a fixed network break down and free transmission capacity of satellite systems is used for them.

SUMMARY OF THE INVENTION

An object of the present invention is to create a process and a system/circuit arrangement which automatically initiate and monitor alternative routing via satellite irrespective of the transmission medium that might be out-of-order, the satellite transmission capacity available for alternative routing purposes being usable by a larger number of users and assignment in the case of alternative routing being autonomous, i.e., automatic.

The advantages of such a design approach lie in the fact that, in the case of alternative routing, a larger number of satellite terminals is able to access a smaller number of satellite transmission channels with the aid of an automatic, decentralized, local and intelligent control unit. The control software necessary for this purpose is stored in the respective local control unit. It controls and monitors the components of the terminal in the waiting state and in the case of alternative routing. It also takes over the automatic control of connection setup and tear-down; in so doing, the software reacts to control signals of the customer data device without, however, influencing the customer data itself. The automatic and decentralized control of the use of satellite transmission capacity for the substitution of out-of-order lines in terrestrial networks and the alternative routing via a second transmission medium, namely satellite transmission, including automatic monitoring of capacity use, are effected via software control, the occupancy state of the satellite transmission capacity being monitored locally and the failure of the terrestrial call connection being detected locally, and the alternative routing to satellite transmission being carried out independently and automatically. In this context, the function of the hub is passive and is used for collecting call data and preconfigurating the individual terminals during initial installation and if there is a change in the network layout. The updating of the network software can be transmitted to the terminal locations without direct involvement of personnel. Further features, such as the reserving of spare satellite capacity, are readily possible. The hub can be connected to the terminals in various ways, such as via a telephone-modem link, via an ISDN connection, via a GSM connection with modem, via a satellite connection within the capacity available in the network, etc. All the satellite terminals can be synchronized by integrating a "DCF77" receiver in each terminal, the standard time being used as the system time for clocking.

The above-described measures, process steps and system for the first time permit an independent, local control which monitors the backup terminal using the software specially written for this application, cooperates in limited manner with the data transmission device of the user and detects the need for alternative routing based on the analysis of a data control signal. The control apparatus, i.e. the system, switches on the transmission carrier of the affected satellite modem which is then received by all other, non-affected terminals in the network. The transmission capacity of the asynchronous overhead of the satellite modem is used for the transmission of destination addresses. The independent and decentralized control or administration of the satellite transmission channels of a pool by many satellite terminals without participation of a controlling central station means that, even when the terrestrial transmission path is out of order, there is the possibility of free-running alternative routing via a different medium.

Further features and refinements of the process and circuit arrangement or system according to the present invention come to light from the exemplary embodiments described in the following.

BRIEF DESCRIPTION OF THE DRAWINGS

FIG. 1 shows a basic circuit diagram of a system according to the present invention for the substitution of out-of-order lines of a terrestrial network by alternative routing through a satellite connection.

FIG. 2 shows a carrier pool for use in accordance with the present invention.

DETAILED DESCRIPTION

Figure 3A:
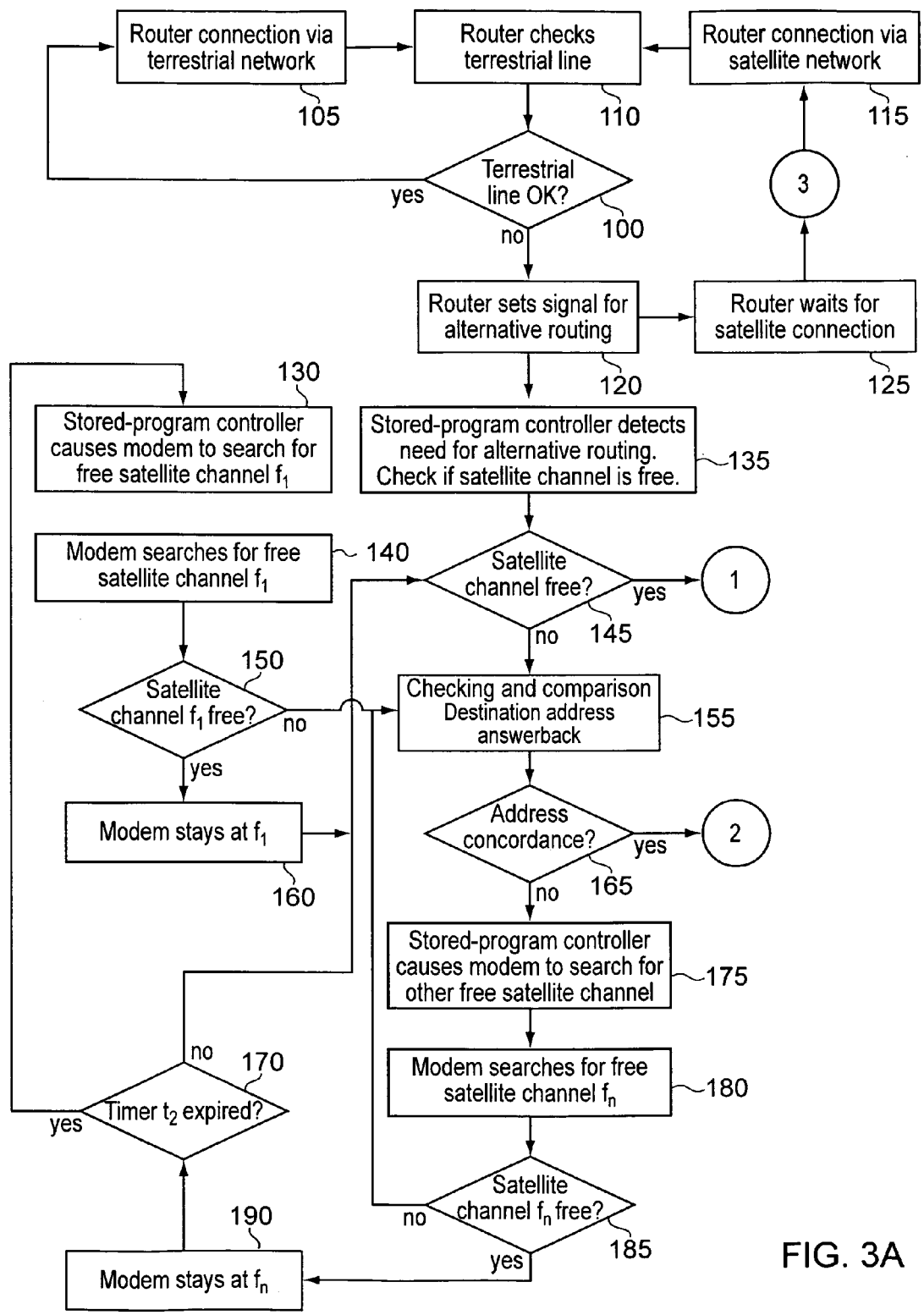
FIG. 3A shows a first flow chart according to the present invention.

FIG. 1 shows a basic circuit diagram required for implementing the system and process for the automatic, decentralized control of the use of satellite transmission capacity for the substitution of out-of-order data lines in terrestrial networks. FIG. 1 shows a terrestrial network 1 which is connected via each of lines 2 and 3 to a router or similar circuit 6. In the example shown, it is assumed that line 2 is out of order. Terrestrial network 1 is also connected to a "hub" 4 via a modem 5. Routers 6 are each connected to customer devices 8 and to terminals 9 for data input and output. In addition, routers 6 are each connected to a stored-program controller 7, in each case via a line 12. Furthermore, each of the two stored-program controllers 7 is connected to a modem 5, via which stored-program controllers 7 are able to enter into communication via a line 11 with hub 4, for example for the reporting of detected equipment faults in the free-line state. Stored-program controllers 7 are each connected via a line 13 to a satellite modem 15. There are also connections via control lines 14 and 17. The two modems 15 are each in communication with a satellite antenna 18, the satellite antennas 18 being in communication with each other by way of a satellite 20 via certain carrier frequencies $f_n$ 19.

A backup terminal 16 or 16' is composed of:
the satellite external unit, antenna 18, carrier 19 and satellite 20,
the connection to the internal unit, and
the internal unit with:
satellite modem (sat modem) 15 and
control device 7=stored-program controller
connection of stored-program controller 7 to the terrestrial switched network 1 via modem 5 and line 11.

Hub 4 is made of a PC which is connected via a suitable interface card to terrestrial network 1. The PC may, where appropriate, be connected to other networks for the forwarding of the call data for tariffing/invoicing purposes. The PC is provided with a software which is able to communicate with the individual stored-program controllers 7 of backup terminals 16, 16' via terrestrial connection 11. Hub 4 and stored-program controller 7 each have their own addressing system. If necessary, hub 4 can enter into contact with stored-program controllers 7 of the individual terminals, for example regularly at the month's end in order to interrogate the call data file.

The creation and transfer of reconfiguration data to the individual terminals is manually initiated and monitored. Hub 4 is able to register the use of a plurality of transmission channel pools, and has knowledge of the individual transmission channels (frequencies, data rate) as well as of their assignment to the respective pools. There is no online monitoring of the use of the transmission channels. In cases of faults, stored-program controllers 7 report the modem parameters to hub 4 for initial fault location.

FIG. 2 shows a carrier pool having a plurality of satellite transmission channels $f_1$–$f_{n+1}$ of a defined data rate. Hereinbelow, the functions of the individual components as well as their modes of operation and the interaction between them are described.

The backup network—which, strictly speaking, is not a "network" at all, because point-to-point connection choice is not possible—includes a pool of satellite transmission channels which will be described later with reference to FIG. 2 and which can be employed specifically for use in backup networks with prepared terminals when there is a need for alternative routing. Many terminals share a small number of satellite transmission channels. There is no central authorization check for a backup connection setup. The use of the transmission channels is on a first come, first served basis. The reserving of transmission channels or prioritization in the use of the transmission channels is basically possible, as is the central online monitoring of the use of the pool. All connections to be alternatively switched are symmetrical duplex channels (identical data rate in the send and receive directions). The individual transmission channels are combined into channel pairs having the mid-frequencies $f_n/f_{n+1}$ (n=1, 3, 5 . . . ). In the original state of the backup network, which is always desired, all transmission channels are unused and the transmission carriers of all approved terminals in the network are switched off; in this case, approved means those terminals which have been registered for the lawful use of the transmission channels. At all terminals, the sat modems are set to receive the first transmission channel $(f_1)$; furthermore, it is assumed that all the sat modems used can be switched to a "loop-back" mode. Thus, an unauthorized data output can be prevented, possibly when synchronizing to any carrier 19 if the addresses are not identical. Since no terminal is transmitting, all sat modems 15 are in the syncloss state (synchronization loss=no reception and therefore no synchronization to a reception signal), which is communicated to stored-program controller 7 (SPS 7) via an interface and line 17. Stored-program controller 7 monitors the sat modem status and an output of a router 6 or of the data terminal, such as terminal 9, which signals detection of the failure of terrestrial data line 2. A terrestrial line failure (backup case) is normally detected at both points of a connection and is communicated by the respective router 6 to stored-program controller 7 in such a form that the DTRA signal in the data stream from router 6 is evaluated (potential change). In order to prevent a protracted search process and therefore in order to accelerate alternative routing, in each point-to-point connection, one terminal is given a priority position as master 16 vis-à-vis the other terminal as slave 16'; only the master 16 is enabled under software control to initiate alternative routing.

As soon as at the location, for example of terminals 16, 16', routers 6 determine the failure of terrestrial line 2 of a connection, the respective stored-program controller 7 detects the potential change of the DTR signal. Stored-program controller 7 of terminal 16 switches on transmission carrier $f_1$ at modem 15 (M+C interface), which signals the start of tariffing and changes the setting of the receiving frequency to $f_2$. Master stored-program controller 7 transmits connection information via line 14 to terminal 16' (slave) until the connection is established, max. for $t_1$=a seconds.

The connection information contains:
destination address (terminal 16'),
transmission frequency $f_2$ to be set by terminal 16',
data rate,
request to switch on transmission carrier $f_2$.

Although normally known, frequency and data rate are transmitted for checking purposes and in order to ensure the compatibility of the modem settings. If not identical, termination of connection setup for security reasons; prevention of disturbance of others by possibly impermissible carrier activation.

All terminals (except terminal 16) receive $f_1$ (modem sync). The connection information is evaluated by all stored-program controllers 7. On the basis of the destination address, terminal 16' detects the connection request which is directed to it; stored-program controller 7 checks the setting data and switches on transmission carrier $f_2$; after the connection is established, the terminal's own address and the current setting data are transmitted as confirmation via lines 14 to terminal 16. The modem terminal 16 synchronizes to $f_2$ and evaluates the transmitted data. Both stored-program controllers 7 detect the existence of the backup connection, cancel, where appropriate, the "loop-back" mode of the participating modems and forward this, where appropriate, as starting signal (DTRB signal: potential change) to the respective router 7.

Hereinbelow, the connection of stored-program controller 7 to hub 4 (optional, as expansion of performance capability) is described. After the occurrence of a backup case, stored-program controllers 7 of affected terminals 9 attempt to report the fault to hub 4 via terrestrial switched line 2 or 3. Since, in the majority of cases, particularly in the exchange area, the data line and the ISDN line are carried in one cable, stored-program controller 7 of out-of-order line section 2 will attempt in vain to reach hub 4. Stored-program controller 7 of line section 3, which is not out of order, reaches hub 4. Hub 4 recognizes the message and deduces from the absence of a message from the second terminal that there is a fault, which leads to an indication on hub 4 (monitoring computer). If the second message is also received, it is necessary to provide an indication capable of initiating a manual investigation of the SPS message. In an existing connection, stored-program controller 7 monitors the modem sync and, if applicable, registers the cause of an unscheduled connection termination. Stored-program controllers 7 themselves exchange monitoring data, such as their own addresses, via line 14 in both directions. Routers 6 of both terminals detect, for example through regular polling, the return of terrestrial line 2; the participating stored-program controllers 7 ascertain this through a renewed potential change of the DTR signal. Via line 14, master stored-program controller 7 requests slave stored-program controller 7 to switch off carrier $f_2$ of modem 15. The modem of terminal 16 registers syncloss $f_2$, which is taken over by stored-program controller 7 via M+C interface 17. Stored-program controller 7 thereupon likewise switches off carrier $f_1$ (end of tariffing) and again sets modem 15 to receive $f_1$. Modem 15 of terminal 16' registers syncloss $f_1$, and remains on reception of $f_1$. If applicable, both modems 15 are switched again to "loop-back mode" by stored-program controller 7. After successful connection teardown, both stored-program controllers 7 independently inform hub 4, via terrestrial switched lines 2 and 3, of their return to the waiting state.

As already described, all non-active terminals receive the connection information. After registration of the occupied carrier pair $f_1/f_2$ in stored-program controller 7, all non-addressed terminals are set to receive the next carrier pair $f_3$ and $f_n$, respectively; with n=1, 3, 5 . . . . In order to be able to return to the original state within a reasonable time, after a waiting time of $t_2$=b sec. (with b, for example, 15 sec.), the respective stored-program controller 7 of each terminal not involved in a call switches modem 15 back to the reception of $f_1$. If carrier 19 is still occupied, i.e. if another terminal is using that carrier, then modem 15 synchronizes (modem sync). Stored-program controller 7 detects the modem sync and, in order to guarantee stable reception, after $t_3$=c sec. (15 sec., for example) switches modem 15 back to the reception of $f_3/f_n$. After the waiting time $t_2$=b sec., there is a renewed check for $f_1$. If there is no reception of $f_1$, i.e. modem syncloss, this is an indicator of the non-occupation of carrier pair $f_1/f_n$. All terminals/modems which cannot synchronize to $f_1$ remain on the reception of $f_1$. If, during an already existing alternative routing, i.e. $f_1/f_2$ ($f_n/f_{n+1}$) occupied, there is a further case of alternative routing, all non-active terminals are in a non-synchronized receiving situation. Terminals n (3, for example) and n+1 (4, for example) are requested for the alternative routing; terminal 3 controls the connection setup. All non-participating terminals are set to receive the next free carrier $f_n$ and check, according to waiting time $t_2$=b, for carriers $f_1$ and $f_n$, until, in the ideal case, they remain on the reception of $f_1$, the original state. The reaction time of the "network", i.e. the time required by a terminal after detection of a terrestrial line failure to provide a backup connection, is a function of the number of carriers kept available in the pool, the duration of the checking and routing operations of the modem to determine the availability of a carrier pair, and possibly of other, as yet unidentified influences.

Since all terminals are operated in non-synchronized manner, all checking and routing operations are performed individually. Thus, after the existence of an active alternative routing, any further alternative routing request may be delayed in that, for example, terminal 16 (master) is currently checking on an occupied frequency and is therefore unable to react, and terminal 16' (slave) remains in some waiting position which, however, is left again after $t_2$=b sec. in order to check for the first free carrier. Therefore, in order to set up the desired alternative routing, after the occupied frequency has been left, terminal 16 must seek the next free carrier, remain there and, after activation of carrier $f_n$, emit its connection request continuously for $t_1$=a sec. until terminal 16' has synchronized to $f_n$ and detects the connection request. This is then followed by the already described connection setup. If connection failures occur simultaneously on a plurality of terrestrial lines, there is the risk of multiple transmissions of various master terminals on one transmission channel (exception, see under star network). There may be collisions which prevent a reliable synchronization of modems 15 of respective slave terminals 16'. Slave modems 15 may fall into an undependable operating state which is communicated as syncloss to stored-program controller 7. Slave stored-program controller 7 now assumes that the transmission channel is unoccupied and remains there for the waiting time $t_2$=b sec.; thereafter, checking is started once again for the first free transmission channel $f_1$. After transmission of the connection request, master terminals 16 expect reception of slave terminal 16' on $f_{n+1}$ within a time window of $t_1$=a min. If there is no synchronization to $f_{n+1}$ within this time window, then transmission carrier $f_n$ is switched off and the search for the first free transmission channel is initiated once again by master stored-program controller 7. If master terminal 16 is already on the first transmission channel, then stored-program controller 7 restarts a connection setup via $f_1$, after a statistical waiting time of $t_5$=e sec.

Use in a star network, in which there is a plurality of connections to the external stations from the star point, is to be regarded as a special case/exception. The star point in this case is always master terminal 16, which initiates the switching of, in some instances, a plurality of alternatively routed calls (one modem for each). If the terrestrial line to the star point itself is out of order, then connections stored in advance in stored-program controller 7 are set up with first priority. No information about the number of connections then established is possible if several networks have access to the pool channels. Furthermore, if there is a shortage of transmission channels relative to the number of terminals, such an alternative routing case may result in complete utilization of the pool. Any other occurring alternative routing cases are then rejected; the terminals check for free transmission channels. There may be an indication on stored-program controller 7. Priority control should then be provided.

Fully inter-meshed networks are to be regarded as a further special case in which, in the ideal case, each terminal is able to reach each other terminal by a kind of dial-up connection. This is not directly possible with the master/slave relationship described here. However, it is readily conceivable to make a modification such that, for alternative routing in such networks, defined traffic relationships are stored in advance in stored-program controller 7, including the respective functions of the locations as master or slave. The alternative routing then corresponds to a normal point-to-point connection.

If a deterioration in transmission quality is detected during an existing alternatively routed connection, for example as a result of an increased bit error rate which finally leads to a syncloss of one of the two links, then, after a waiting time of $t_6 = f$ min, the entire connection is torn down, initiated by the respective stored-program controller 7 (master or slave). At the same time, an alarm is generated. If master stored-program controller 7 does not discover a device fault of its own, it can optimally initiate a new connection setup after a waiting time $t_7 = g$ sec. If this does not result in a successful connection, there is a continuous alarm in stored-program controller 7 and possibly a message via line 11 and terrestrial dial-up connection 1 to hub 4.

An undependable operating state of a master terminal 16, ready to receive on $f_1$, may occur if the reception field strength has fallen to such an extent at the location due to weather conditions, that any backup case of another location cannot be detected because modem 15 remains in syncloss and therefore indicates a free channel pair. However, after a weather improvement and an increase in reception field strength, modem 15 synchronizes and detects the occupied state. Stored-program controller 7 then initiates the usual search. If, in the described undependable operating state, a backup case additionally occurs in the connection of master terminal 16, this will activate transmission carrier $f_1$, and therefore, with the carrier pair already occupied, cause a fault as a result of the double transmission. The already existing connection may be interrupted because of this. The interruption may be prevented if $t_6$ (waiting time in the case of syncloss) is set to be greater than $t_1$ (waiting time of master for response from slave), since, if there is no response, master terminal 16 breaks off the transmission of $f_1$ again and searches for another free carrier pair. In this context, it is assumed that the associated slave terminal 16' does not have faulty reception and has therefore detected the occupation of $f_1/f_n$. Stored-program controller 7 monitors modem 15 and/or, if possible, the external unit locally at each location via M+C interface 17. If, in so doing, faults are detected which are not due to configuration faults, i.e. which cannot be remedied by reconfiguration, then a connection setup is not possible.

Devices for visual and audible alarm generation can be connected to or integrated into stored-program controller 7 for the local indication of faults and call failures. Nonestablished backup connections owing to occupied states, all transmission channels occupied, can be indicated visually and/or audibly. All error messages are stored in stored-program controller 7.

Terminals 16, 16' are monitored by stored-program controller 7. Discovered anomalies are additionally reported to hub 4 directly via terrestrial dial-up connection 1 for local storage. The FBA process used by DTAG is employed for this purpose.

In the case of local data recording, all alternatively routed calls and connection setup attempts are stored in stored-program controller 7. The following are to be recorded: start and end of connection, type of end of connection, regular/aborted, cause of abort.

In the case of central recording, at a time stored in stored-program controller 7, the individual terminals forward to the hub the calls handled over a certain period, such as a month.

Stored-program controller 7 stores all locally required data needed for
 communication with its own modem, router/DTE, modem of the distant station, possibly external unit;
 connection setup with distant station(s): address(es), frequencies of transmission channels, transmitting power, corresponding data rate(s) and link request for each location;
 alarm generation concept;
 communication with the hub.

Stored-program controller 7 works independently without a connected input terminal. All operations are carried out according to the above-indicated process. The software required for this purpose must be stored in a storage device which, for example, if so requested by the customer, may also be in the form of a non-volatile storage device.

The connection data is sent to hub 4 for tariffing and traffic evaluation purposes if required, this being done regularly by temporary dial-up via terrestrial network 1.

Reconfigurations can be easily carried out, the individual reconfiguration of possibly each backup terminal being required for changes with regard to the number and/or frequencies of the transmission channels, data rate, origin/destination locations, master/slave relationship etc. The loading of new software is accomplished from hub 4 via the terrestrial connection. For this purpose, the reconfiguration is created in hub 4 and is transferred to stored-program controllers 7 of the individual terminals after dialing up.

Figure 3B:
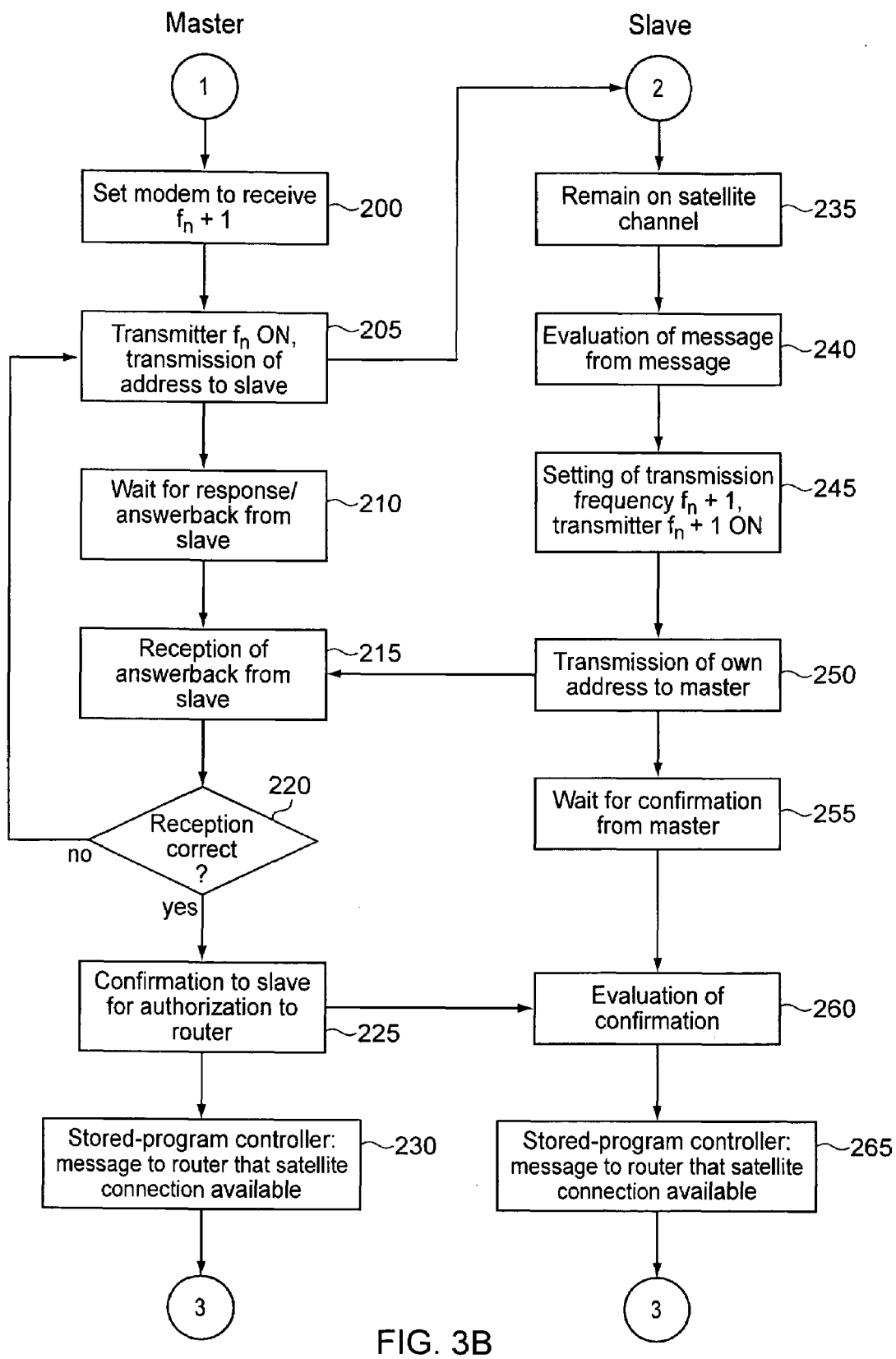
FIG. 3B shows a second flow chart according to the present invention.

FIGS. 3A and 3B show basic flow charts representing a process sequence for controlling the use of satellite transmission capacity for the substitution of out-of-order data lines in terrestrial networks. The router first of all checks whether the terrestrial line is in order or not (step 105). If it is in order, this is indicated by a command or a "yes" signal and the router establishes the connection via the terrestrial network (step 105). Conversely, if in response to the check, a "no" signal is generated, then the router initiates a signal to alternatively route and waits for the satellite connection. If a satellite connection is available, indicated by the circled 3 in the diagram according to FIG. 3A and FIG. 3B, the router connection (step 125) is established via a satellite connection (step 115). In the following, the generation of the message to the router that a satellite connection is available, represented by the circled 3, is explained with reference to the flow charts in FIGS. 3A and 3B. When the router transmits the signal to alternatively route, the stored-program controller detects the need to alternatively route and therefore the need to check whether a satellite channel, i.e.

satellite capacity is free (steps 135, 145). If there is spare satellite capacity, then the check is answered with a "yes" and a corresponding signal, represented by the circled 1, is triggered. This signal is sent to the master terminal, as shown in FIG. 3B. Consequently, the sat modem of the master is set to receive the frequency $f_{n+1}$; at the same time (step 200), the transmitter is also switched on and the address is transmitted to the slave terminal (step 205), it being necessary also for the address-concordance signal, represented by the circled 2, to be present. As shown in the diagram in FIG. 3B, the master terminal must then wait for a response or answerback from the slave (step 210). If the slave terminal remains on the satellite channel (step 235), the evaluation of the message from the master is then carried out (step 240) and, as a result thereof, transmission frequency $f_{n+1}$ is set and transmitter $f_{n+1}$ is switched on (step 245). Thereafter, the slave terminal transmits its own address to the master terminal, which waits to receive the answerback from the slave terminal (step 215). If the reception is correct (step 220), then confirmation is sent to the waiting slave terminal and authorization is sent to the router (step 225). Before waiting for confirmation from the master terminal, the address of the slave terminal is transmitted to the master terminal (step 250). If reception is correct, identified by "yes" in FIG. 3B (step 220), the stored-program controller SPS sends a message to the router that the satellite connection is available (step 230), as a result of which the message, represented by the circled 3, is sent and the router is thus able to leave its waiting position and utilize the satellite connection. Conversely, if reception was not correct, represented by a "no" in FIG. 3B, then, as already stated, the address is transmitted to the slave terminal. If reception was correct, then, as already stated, this is indicated by a message identified by "yes". The slave terminal waits for the confirmation of the master (step 255), evaluates the confirmation (step 260) and, if concordant, then forwards this to the controller, as a result of which the message from the controller of the slave terminal is sent to the router to the effect that the satellite connection is available (step 265), indicated by the circled 3 in FIG. 3B.

In the following, the address-concordance message, indicated by the circled 2, is described. If no satellite channel is free, this is indicated by a "no" message in FIG. 3A. Thereupon, a check and a comparison of the destination address with the "no" message as to whether satellite channel $f_1$ is free is carried out (step 155). Namely, if the addresses are not identical (step 165), represented by the "no" message, then the controller causes the corresponding modem to search for another free satellite channel $f_n$ (steps 175, 180). If satellite channel $f_n$ is not free (step 185), then there is a feedback to the checking and comparison circuit for the destination address (step 155). Conversely, if satellite channel $f_n$ is free, then this is indicated by a "yes" message and the modem remains at frequency $f_n$ (step 190). If timer $t_2$ has not expired (step 190). This is fed back by a message "$f_n$ satellite channel free". Conversely, if timer $t_2$ has expired (step 170), this is indicated by a "yes" and the controller causes the modem to search for a free satellite channel $f_1$ (steps 130, 140). If satellite channel $f_1$ is not free, then a "no" message is generated and a check and comparison of the destination address is carried out once again (step 155). Conversely, if satellite channel $f_1$ is free (step 150), then the modem remains at frequency $f_1$ (step 160), and a message is generated according to the circled 1.

Definitions

DAMA function: Demand Assigned Multiple Access: Demand-oriented assignment of transmission capacity after request with changing destinations (switched network), usually with central capacity management;

Loop-back mode: Setting possibilities in the satellite modem for forming loops in the transmission path in order to check and isolate individual functional components within the satellite modem;

M+C interface: Monitoring and control interface of the satellite modem, by which it is possible to adjust and monitor the configuration of the satellite modem from outside;

Modem sync: Demodulator of the satellite modem has synchronized to a received signal; connection via satellite usable;

Modem syncloss: Demodulator of the satellite modem has lost received signal; connection interrupted;

Pool: Number of several satellite transmission channels of one data rate;

Space segment capacity: Transmission capacity in the satellite;

Satellite modem: Modulator/demodulator which converts the terrestrial user-information data into the intermediate frequency level (70 MHz);

SPS: Stored-program controller which independently executes monitoring and control functions.

LIST OF REFERENCE NUMERALS

1, Terrestrial network
2,3 Lines
4 Hub
5 Modem
6 Router
7 Controller
8 Customer devices
9 Terminals
10–14 Lines
15 Satellite modem
16, 16' Backup terminals
17 Lines
18 Satellite antenna
19 Carrier frequencies; carriers
20 Satellite

What is claimed is:

1. A process for controlling a use of a satellite transmission capacity in order to achieve a substitution of out-of-order data lines in terrestrial networks such that an alternative routing via a satellite is initiated and monitored and an assignment is effected with respect to the alternative routing, the process comprising the steps of:

causing a plurality of controllers controlled by software and respectively allocated to one of a master terminal and a slave terminal to achieve a control that is automatic, decentralized, and local;

causing the plurality of controllers to detect a need for the alternative routing based on an analysis of a data control signal from a data transmission device of a user;

using a control software to monitor locally and automatically an occupancy state of the satellite transmission capacity; and carrying out software-controlled alternative routing operations via a respective one of the plurality of controllers.

2. The process according to claim 1, wherein:
the control software is stored in a respective one of the plurality of controllers,
components of a respective one of the master terminal and the slave terminal are controlled and monitored in a waiting state in the case of the alternative routing, and
the stored control software reacts to control signals of a customer data device without influencing customer data of the customer data device.

3. The process according to claim 1, wherein:
an automatic and decentralized control of the use of the satellite transmission capacity for the substitution of the out-of-order lines in the terrestrial networks and the alternative routing via a second transmission medium, including an automatic monitoring of capacity use, are effected via the control software,
the occupancy state of the satellite transmission capacity is monitored locally, and
a failure of a terrestrial call connection is detected locally.

4. The process according to claim 1, further comprising the steps of:
using a passive hub to collect connection data and pre-configure the master terminal and the slave terminal during an initial installation;
if a change in a network layout occurs, connecting the passive hub to the master terminal and the slave terminal via one of a telephone-modem link, an ISDN connection, a GSM connection with modem, and a satellite connection within an available network capacity.

5. The process according to claim 1, further comprising the step of:
synchronizing each one of the master terminal and the slave terminal by integrating a DCF77 receiver in each one of the master terminal and the slave terminal, wherein a standard time is used as a system time for performing a clocking.

6. The process according to claim 1 further comprising the steps of:
switching on a transmitter carrier of an affected satellite modem;
receiving the transmitter carrier by each non-affected network terminal; and
using a transmission capacity of an asynchronous overhead of the satellite modem to transmit destination addresses, wherein a free-running alternative routing via a different medium is available when a terrestrial transmission path is out of order.

7. A circuit arrangement for implementing a process that controls a use of a satellite transmission capacity in order to achieve a substitution of out-of-order data lines in terrestrial networks such that an alternative routing via a satellite is initiated and monitored and an assignment is effected with respect to the alternative routing, the circuit arrangement comprising:
a plurality of backup terminals, each one of the backup terminals corresponding to one of a master terminal and a slave terminal and each one of the backup terminals including:
an antenna,
a carrier, and
a satellite, wherein:
each one of the backup terminals is connected to a corresponding one of a plurality of satellite modems in order to achieve an automatic switchover to free transmission satellite channels when the alternative routing of at least one of the terrestrial networks occurs,
each one of the backup terminals is provided with a corresponding one of a plurality of independent, software-controlled, decentrally disposed, local, and intelligent control units,
each one of the control units is allocated a corresponding one of a plurality of other modems,
each one of the plurality of control units is connected to a corresponding one of a plurality of routers, and
each one of the plurality of routers is capable of being connected to customer devices, customer terminals, and to communication lines.

8. The circuit arrangement according to claim 7, further comprising:
a hub connected via one of the plurality of other modems to the at least one of the terrestrial networks, wherein the hub is equipped with software for communicating via a terrestrial connection with the plurality of control units, and wherein the plurality of control units and the hub are each provided with a respective addressing system.

9. The circuit arrangement according to claim 8, wherein:
the hub registers a use of a plurality of transmission pools,
the hub includes information about individual transmission channels and about an assignment of each one of the individual transmission channels to a respective one of the plurality of transmission pools,
in the case of a fault, the plurality of control units transmits modem parameters to the hub to achieve an initial fault location, and
a carrier pool is equipped with a plurality of satellite transmission channels of a defined data rate.

10. The circuit arrangement according to claim 9, wherein:
the individual transmission channels are used according to a first come, first served basis, one of a reserving and a prioritization of the individual transmission channels is achieved, the transmission pools are monitored according to a centralized online monitoring of a pool use, and all connections to be alternatively routed are symmetrical duplex channels with identical data rates in a send direction and a receive direction.

11. The circuit arrangement according to claim 9, wherein the individual transmission channels are combined into channel pairs having mid-frequencies.

12. The circuit arrangement according to claim 8, wherein:
each one of the plurality of control units are connected via a communication line to a corresponding one of the plurality of satellite modems and to a plurality of control lines,
each one of the plurality of satellite modems is in communication with a corresponding satellite antenna of each backup terminal, and
the antenna of one of the plurality of backup terminals communicates with the antenna of another one of the plurality of backup terminals via defined carrier frequencies of the satellite.

13. The circuit arrangement according to claim 8, wherein:
each one of the satellite modems and an associated one of the control units are arranged as an internal unit,
one of the plurality of backup terminals is arranged as a satellite external unit that includes the antenna, the carrier, the satellite, and a connection to an associated internal unit, and a connection is made between the control unit of each of the internal units and the at least one of the terrestrial networks.

14. The circuit arrangement according to claim 8, wherein:
the hub includes a personal computer that is connected via an interface card to the at least one of the terrestrial networks, the hub is connected to other networks in order to forward connection data relating to at least one of a tariffing operation and an invoicing operation.

* * * * *